(12) United States Patent
Spring et al.

(10) Patent No.: US 6,227,800 B1
(45) Date of Patent: May 8, 2001

(54) BAY COOLED TURBINE CASING

(75) Inventors: Samuel D. Spring, Stratham, NH (US); Robert J. Carita, Needham; Herbert A. Stocking, Salem, both of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/200,386

(22) Filed: Nov. 24, 1998

(51) Int. Cl.$^7$ .................................................... F04D 31/00
(52) U.S. Cl. ..................... 415/116; 415/178; 415/213.1; 415/221; 415/914; 60/262; 60/39.83
(58) Field of Search .................................. 415/175, 176, 415/178, 213.1, 221, 914, 116; 60/262, 226.1, 39.83

(56) References Cited

U.S. PATENT DOCUMENTS

| | | | |
|---|---|---|---|
| 4,338,061 | * | 7/1982 | Beitler et al. .............................. 415/1 |
| 4,841,726 | * | 6/1989 | Burkhardt ............................ 60/226.1 |
| 5,351,732 | * | 10/1994 | Mills et al. ............................ 415/175 |
| 5,407,320 | * | 4/1995 | Hutchinson ............................ 415/116 |

OTHER PUBLICATIONS

CFE, "CFE 738 Engine (Zone II) Cooling Scheme," Shows LP turbine baffle and pin–mounted floating nozzles, in commercial use in USA more than a year, five (5) pages.

* cited by examiner

*Primary Examiner*—Edward K. Look
*Assistant Examiner*—Ninh Nguyen
(74) *Attorney, Agent, or Firm*—Andrew C. Hess; Nathan D. Herkamp

(57) ABSTRACT

A turbine casing supports a row of nozzle vanes through which are flowable hot combustion gases. A baffle surrounds the casing to define a cooling duct. A nacelle surrounds the turbine casing to define a bay having an inlet for receiving bay air, and an outlet for discharging the air. The cooling duct includes an inlet which receives the bay air for flow along the turbine casing for selective cooling thereof.

18 Claims, 2 Drawing Sheets

BAY COOLED TURBINE CASING

BACKGROUND OF THE INVENTION

The present invention relates generally to gas turbine engines, and, more specifically, to cooling therein.

In a turbofan gas turbine engine, air is pressurized in a compressor and mixed with fuel and ignited in a combustor for generating hot combustion gases which flow downstream through several turbine stages which extract energy therefrom. The turbine stages include a row of nozzle stator vanes which turn and accelerate the combustion gases into a corresponding row of turbine rotor blades which extract energy therefrom for rotating a supporting disk. A high pressure turbine (HPT) first receives combustion gases from the combustor and powers the compressor. And, a low pressure turbine (LPT) is disposed downstream from the HPT and extracts additional energy for powering the fan upstream of the compressor which produces propulsion thrust for powering an aircraft in flight.

Since the turbine components are subject to heating by the combustion gases, the temperature thereof must be limited for obtaining a useful life during operation. And, temperature control of the turbine components is also required for reducing clearances between the stator and rotor components for maximizing the thermodynamic efficiency of the engine.

The various components of the HPT are typically cooled by using a portion of air bled from the compressor which is channeled through dedicated circuits specifically configured therefor. Since the LPT is disposed downstream from the HPT it typically does not require bleed air cooling.

However, a nacelle surrounds the core engine from the compressor to the LPT and typically includes an inlet at its forward end for receiving a small portion of the fan air for purging the bay defined between the nacelle and the various casings of the core engine. A purge air outlet is disposed near the aft end of the nacelle to drive the purge air at low velocity through the bay and remove any fuel vapors therein, as well as provide a small amount of cooling thereby.

The typical LPT casing is therefore subject to the purge air over its outer surface, and is not otherwise cooled. The turbine casing supports the various rows of nozzle vanes as well as turbine shrouds, both of which are maintained at suitable clearances or gaps with the cooperating rotor components. As the rotor and stator components expand and contract during operation, the clearances also expand and contract, and should be maintained as small as possible without experiencing undesirable rubbing between the stator and rotor components.

In some designs, turbine casings are externally cooled. For example, active clearance control is used for selectively cooling a turbine casing for in turn controlling the clearances for improving efficiency. However, these systems introduce additional complexity and expense in the engine.

Accordingly, it is desired to provide improved cooling of turbine casings and passive clearance control.

BRIEF SUMMARY OF THE INVENTION

A turbine casing supports a row of nozzle vanes through which are flowable hot combustion gases. A baffle surrounds the casing to define a cooling duct. A nacelle surrounds the turbine casing to define a bay having an inlet for receiving bay air, and an outlet for discharging the air. The cooling duct includes an inlet which receives the bay air for flow along the turbine casing for selective cooling thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
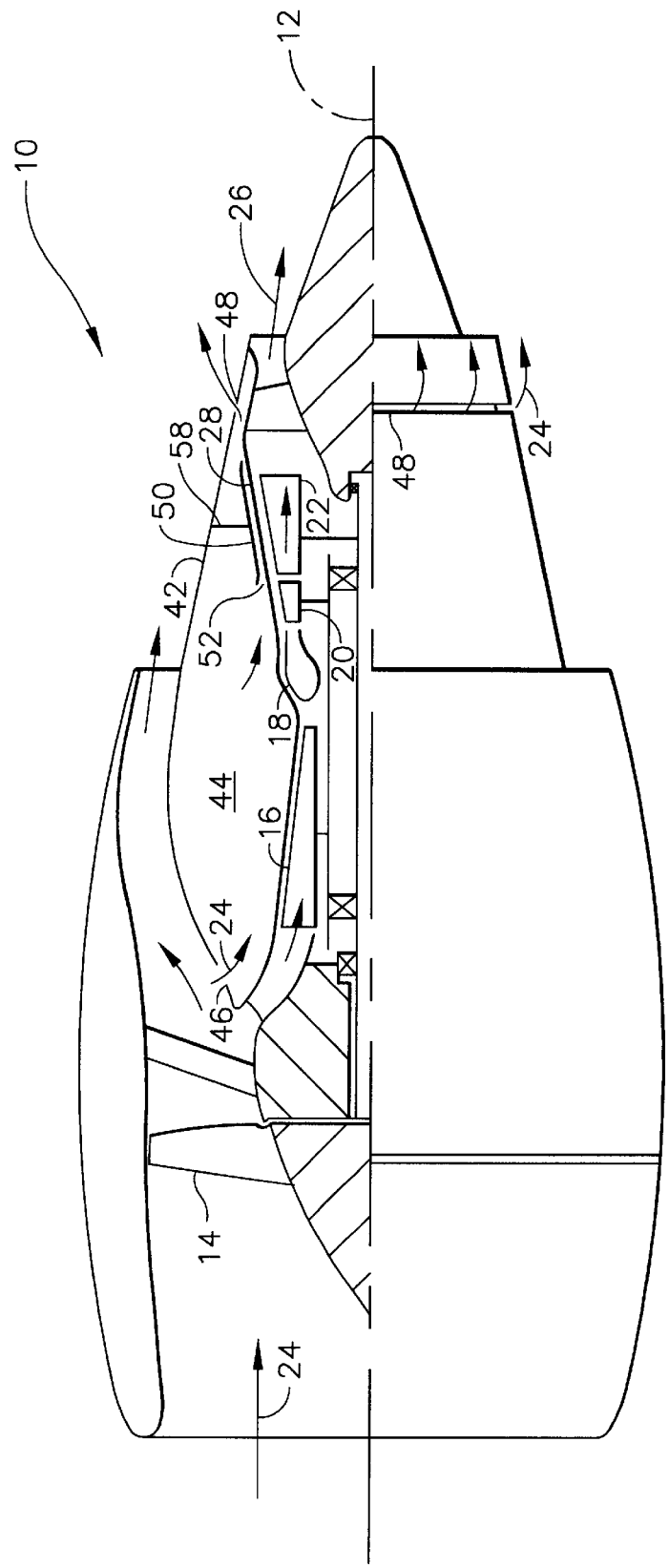
FIG. 1 is an axial, partly sectional view of a turbofan gas turbine engine including turbine casing cooling in accordance with an exemplary embodiment of the present invention.

Illustrated in FIG. 1 is an exemplary turbofan gas turbine engine 10 for powering an aircraft in flight. The engine is axisymmetrical about a longitudinal, axial centerline axis 12 and includes in serial flow communication a fan 14, multistage axial compressor 16, combustor 18, high pressure turbine (HPT) 20, and a low pressure turbine (LPT) 22. During operation, air 24 flows past the fan and into the compressor wherein it is pressurized in stages and channeled to the combustor wherein it is mixed with fuel and ignited for generating hot combustion gases 26. The combustion gases flow in turn through the HPT 20 and LPT 22 which extract energy therefrom for respectively powering the compressor and fan.

Figure 2:
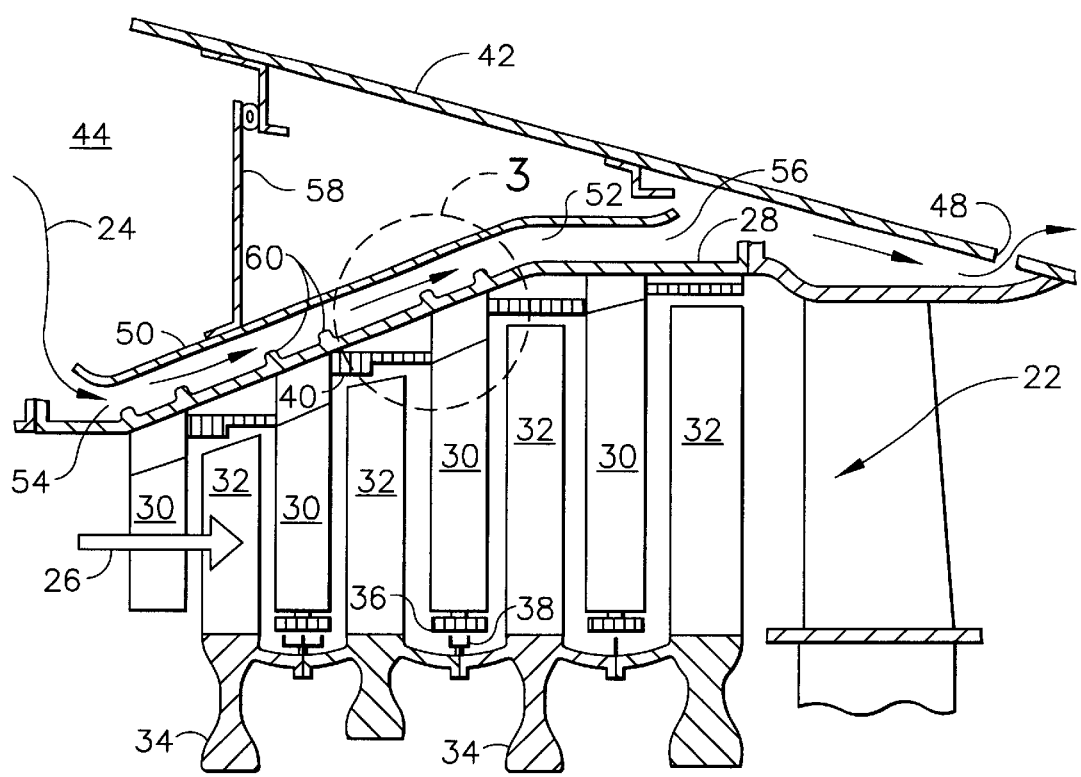
FIG. 2 is an enlarged, partly sectional view of a portion of the low pressure turbine illustrated in FIG. 1 including a baffle for selective cooling thereof.

The LPT 22 is illustrated in more particularity in FIG. 2 and includes an annular turbine casing 28 having a plurality of rows of nozzle stator vanes 30 fixedly mounted thereto for channeling the combustion gases. The LPT also includes a plurality of rows of turbine rotor blades 32 extending radially outwardly from respective rotor disks 34. The vanes 30 are disposed upstream of respective ones of the blade rows for turning and accelerating the combustion gas through the several blade rows in turn.

The radially inner end of the each vane row supports a radially inner seal 36, typically in the form of a honeycomb, which cooperates with opposing seal teeth 38 which extend radially outwardly from the adjoining rotor disks for effecting respective interstage seals at the radial clearances or gaps therebetween.

Correspondingly, a radially outer shroud 40 is fixedly attached to the turbine casing 28 over respective ones of the blade rows for defining with blade tips thereof respective clearances or gaps. During operation, it is desirable to maintain the inner seal clearance and the tip clearance as small as possible to reduce combustion gas leakage therepast which would otherwise decrease the efficiency of the engine. However, the combustion gases also heat the different components of the turbine to different temperatures and cause differential thermal expansion and contraction which correspondingly changes the size of the tip and inner seal clearances. It is therefore desirable to cool the turbine casing 28 for effecting passive clearance control of the clearances therein.

Referring again to FIG. 1, the engine includes an annular nacelle 42 surrounding the core engine, which includes the compressor, combustor, and high pressure turbine, and also surrounds the LPT to define an annular plenum or bay 44 therearound. The bay includes an inlet 46 at an axially forward end thereof in the form of one or more apertures through the nacelle disposed in flow communication with the fan 14, through its downstream fan duct, for receiving therefrom a portion of the air pressurized by the fan for use as bay or purge air, also designated 24. The bay also includes an outlet 48 at an axially aft end thereof in the form of a substantially continuous circumferential slot, or a series of apertures for discharging the bay air from the engine.

An annular baffle 50 circumferentially surrounds the casing 28 and is spaced radially outwardly therefrom to define an annular flow or cooling duct 52 therebetween.

As shown in more particularity in FIG. 2, the cooling duct 52 includes an annular inlet 54 at axially forward end thereof for receiving the bay air from the bay, and an annular outlet 56 at an axially opposite or aft end thereof for discharging the bay air through the bay outlet 48.

In accordance with the present invention, the baffle 50 cooperates with the turbine casing 28 for the selective cooling thereof which passively controls, for example, the clearance at the inner seals 36. In accordance with an improved method of passive clearance control, the nozzle vanes 30 are fixedly joined to the casing 28 at its inner surface to suspend the inner seals 36 radially above the corresponding teeth 38 of the rotor disks 34. A portion of the fan air is diverted from the fan 14 to the bay 44 surrounding the casing 28. The bay air channeled through the bay 44 is constrained by the baffle 50 and accelerated through the cooling duct 52 to flow axially aft over the casing 28 for selective cooling thereof.

The bay air from the cooling duct 52 is discharged from the downstream end of the bay through the duct outlet 56 and in turn the bay outlet 48. In this way, the initially low velocity bay air channeled through the bay 44 not only purges the bay of any fuel fumes, but is then also used for selectively cooling the turbine casing 28 for enhancing its life as well as improving clearance control and corresponding efficiency of the engine.

As shown in both FIGS. 1 and 2, an annular seal 58, in the form of a sheet metal partition for example, fixedly joins the baffle to the nacelle 42 and prevents the bay air from bypassing the cooling duct 52 to the bay outlet 48. The seal 58 cooperates with the baffle 50 to constrain the bay air to flow primarily only through the cooling duct 52 for cooling the turbine casing.

The baffle 50 is spaced radially inwardly from the nacelle 42 so that the cooling duct 52 generally defines a throat of minimum flow area as compared to the larger flow area of the bay 44 upstream therefrom for accelerating the bay air through the cooling duct for effecting forced convection cooling of the radially outer surface of the turbine casing.

Furthermore, the baffle 50 preferably extends completely circumferentially around the casing 28 for circumferentially cooling the casing substantially uniformly for reducing or eliminating differential temperatures around the circumference of the casing which in turn would otherwise vary the clearance at the inner seal 36.

In accordance with an additional feature of the present invention as illustrated in FIG. 2, the turbine casing 28 includes a plurality of axially spaced apart turbulators 60 extending radially outwardly from and circumferentially around the turbine casing 28, and being integrally formed therewith for selectively increasing convection cooling of the casing at these selected locations.

Figure 3:
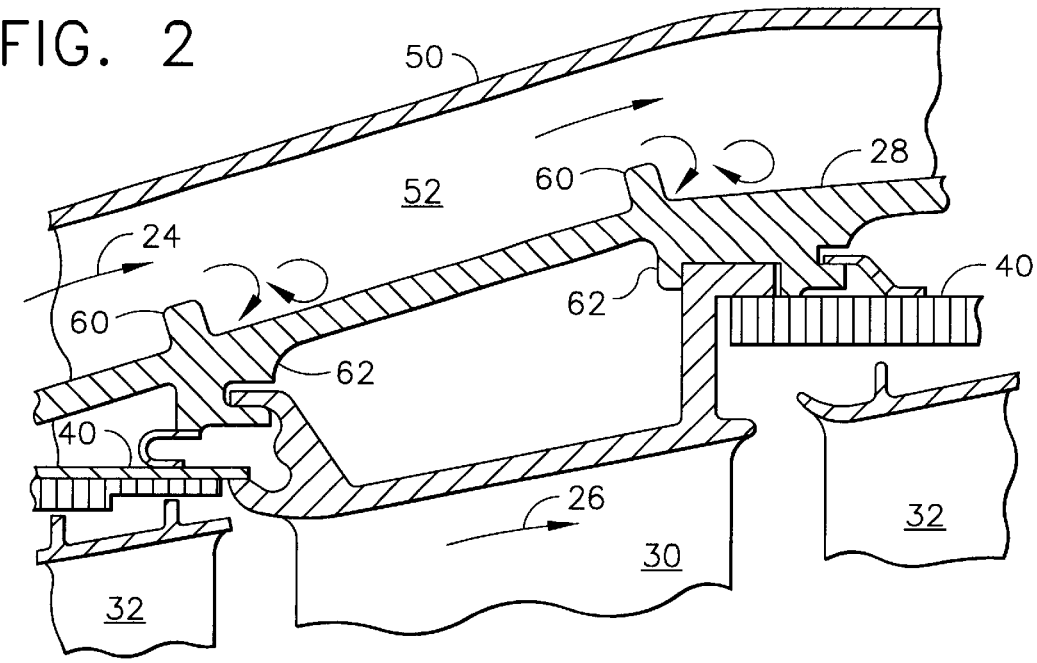
FIG. 3 is a further enlarged, partly sectional view of a portion of the baffle and turbine casing illustrated in FIG. 2 within the dashed circle labeled 3.

The turbulators 60 are illustrated in more detail in FIG. 3. They are specifically positioned relative to the fixed support of the nozzle vanes 30 for passively controlling the clearance at the inner seals 36. The turbine casing 28 includes a plurality of annular support hooks 62 which extend radially inwardly from the casing in locally enlarged portions thereof for supporting both the nozzle vanes 30 and the blade shrouds 40 in a conventional manner. The individual support hooks 62 support corresponding mounting hooks of the radially outer bands of the nozzle vanes directly below the support hooks, as well as support the outer shrouds 40 mounted axially between adjacent vane rows and corresponding support hooks.

The individual turbulators 60 on the outer surface of the turbine casing 28 are preferably aligned with respective ones of the support hooks 62 for both enhancing forced convection cooling of the turbine casing by locally accelerating and interrupting the flow of the bay air channeled through the cooling duct 52, as well as acting as heat dissipating fins for removing heat from the underlying hooks 62.

The so-aligned turbulators 60 are therefore effective for locally increasing heat transfer cooling effectiveness of the bay air radially outwardly of the corresponding support hooks 62 which in turn controls the thermal expansion and contraction of the turbine casing 28 locally at each of the supported vane rows, which in turn controls the clearance between the inner seal 36 and rotor seal teeth 38.

Secondarily, the radial position of the outer shrouds 40, also supported by adjacent hooks 62, is also controlled for in turn controlling the blade tip clearance.

The bay air may therefore be used to further advantage by not only simply purging any fuel vapors from the bay, but also effecting forced convection cooling of the turbine case 28 as the bay air is accelerated into the cooling duct 52. The turbulators 60 are strategically positioned at axial locations corresponding with the underlying supporting hooks 62 for more effectively removing heat therefrom and controlling thermal expansion and contraction of the turbine casing, and in turn providing passive clearance control at the inner seals 36, as well as at the outer shrouds 40. The turbulators 60 as shown in FIG. 2 are preferably positioned solely at corresponding ones of the support hooks 62, and only at those support hooks that are subject to the greatest temperature and require increased cooling, such as at the first three stages of the low pressure turbine.

The turbulators 60 may be sized in radial height and axial width for maximizing their effect for enhanced convection cooling and for acting as fins for extracting heat from the corresponding hooks 62. The turbulators 60 may be manufactured with a variety of cross-sectional profiles in order to maximize heat transfer and/or minimize pressure drop. Since the hooks 62 extend circumferentially around the casing 28, the turbulators 60 preferably also extend circumferentially around the casing in complete rings.

In alternate embodiments, the turbulators may be segmented circumferentially and may be disposed in one or more axial groups near the corresponding support hooks 62. The turbulators may extend solely circumferentially and be oriented normal to the axial direction of the airflow through the cooling duct 52, or the turbulators may be segmented and inclined tangentially or circumferentially parallel to each other, or in chevron or V-shaped configurations. The turbulators 60 may be formed in a common casting or forging in a unitary turbine casing 28 along with the underlying support hooks 62. They may be sized in relative thermal mass compared with the supporting hooks 62 for maximizing the heat extraction therefrom. The turbulators 60 may also be partially or fully formed by machining. Preferably, the radially outer edges of the turbulators 60 have a slight radius. This radius reduces the stress concentration in the corner of the turbulator and helps to avoid cracking of the turbulator from operating stresses.

Cooling of the turbine casing 28 is therefore provided from the available bay air for enjoying additional benefits not previously obtained in the engine. Improved turbine casing cooling is obtained, along with passive clearance control of both the inner seals 36 and outer shrouds 40 fixedly mounted to the turbine casing.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A turbine cooling apparatus comprising:
   a turbine casing including a plurality of support hooks extending radially inwardly from said casing and a plurality of axially spaced apart turbulators extending radially outwardly from said casing and aligned with respective ones of said hooks for extracting heat therefrom;
   a row of nozzle vanes fixedly mounted to said casing for channeling combustion gases;
   a nacelle surrounding said casing and spaced radially outwardly therefrom to define a bay therearound;
   said bay including an inlet at an axially forward end for receiving bay air, and an outlet at an axially aft end for discharging said bay air;
   a baffle surrounding said casing and spaced radially outwardly therefrom to define a cooling duct therebetween for selectively cooling said casing; and
   said cooling duct having an inlet at an axially forward end for receiving said bay air from said bay, and an outlet at an axially aft end for discharging said bay air to said bay outlet.

2. An apparatus according to claim 1 further comprising a seal extending between said nacelle and baffle to constrain said bay air to flow through said cooling duct.

3. An apparatus according to claim 2 wherein said baffle is spaced radially inwardly from said nacelle for accelerating said bay air through said cooling duct.

4. An apparatus according to claim 3 wherein said baffle extends circumferentially around said casing for circumferentially cooling said casing.

5. An apparatus according to claim 4 wherein said turbulators extend circumferentially around said casing for increasing convection cooling thereof.

6. An apparatus according to claim 5 further comprising:
   a plurality of turbine blades disposed in rows inside said casing;
   a plurality of said vane rows disposed upstream of respective ones of said blade rows, and supported from said hooks; and
   a plurality of shrouds spaced radially above respective ones of said blade rows, and supported from said hooks between said vanes.

7. A method of controlling clearance between nozzle vanes fixedly mounted to a turbine casing for channeling combustion gases in a gas turbine engine, and a rotor radially therebelow, comprising:
   diverting a portion of air from a fan of said engine to an upstream end of a bay surrounding said casing;
   locally accelerating and interrupting air from said bay to flow axially aft over said casing for selective convection cooling thereof; and
   discharging said bay air from a downstream end of said bay.

8. A method according to claim 7 further comprising constraining said bay air to flow axially aft through a cooling duct surrounding said casing for selectively cooling said casing.

9. A method according to claim 8 further comprising circumferentially distributing said bay air around said casing for uniformly cooling said casing therearound.

10. A method according to claim 9 wherein said casing includes a plurality of integral hooks supporting therefrom said turbine vanes and blade shrouds, and further comprising locally increasing heat transfer cooling of said bay air radially outwardly of said hooks.

11. A method according to claim 7 wherein:
    said bay surrounds a core engine comprising a compressor, combustor, high pressure turbine, and low pressure turbine including said nozzle vanes; and
    said bay air initially has a low velocity, and is accelerated through a throat of minimum flow area inside said bay for flow aft therefrom over said casing.

12. A method according to claim 11 wherein said bay air is channeled passively through said bay and over said casing.

13. A turbine cooling apparatus comprising:
    a turbine casing including a plurality of axially spaced apart turbulators extending radially outwardly from and circumferentially around said casing;
    a row of nozzle vanes fixedly mounted to said casing for channeling combustion gases;
    a nacelle surrounding said casing and spaced radially outwardly therefrom to define a bay therearound;
    said bay including an inlet at an axially forward end for receiving bay air, and an outlet at an axially aft end for discharging said bay air;
    a baffle surrounding said casing and spaced radially outwardly therefrom to define a cooling duct therebetween for selectively cooling said casing; and
    said cooling duct having an inlet at an axially forward end for receiving said bay air from said bay, and an outlet at an axially aft end for discharging said bay air to bay outlet.

14. An apparatus according to claim 13 wherein said bay surrounds a core engine comprising a compressor, combustor, high pressure turbine, and low pressure turbine including said nozzle vanes.

15. An apparatus according to claim 13 further comprising a seal extending between said nacelle and baffle to constrain said bay air to flow through said cooling duct inlet.

16. An apparatus according to claim 15 wherein said baffle is spaced radially inwardly from said nacelle for accelerating said bay air through said cooling duct.

17. An apparatus according to claim 16 further comprising a plurality of support hooks extending radially inwardly from said casing, and said turbulators are aligned with respective ones of said hooks for extracting heat therefrom.

18. An apparatus according to claim 17 wherein said low pressure turbine further comprises:
    a plurality of turbine blades disposed in rows inside said casing;
    a plurality of said vane rows disposed upstream of respective ones of said blade rows, and supported from said hooks; and
    a plurality of shrouds spaced radially above respective ones of said blades rows, and supported from said hooks between said vanes.

* * * * *